US012635827B2

(12) United States Patent
Liu et al.

(10) Patent No.: US 12,635,827 B2
(45) Date of Patent: May 26, 2026

(54) SHOWER ASSEMBLY AND TWO-IN-ONE COFFEE MACHINE

(71) Applicant: Shenzhen Chenbei Technology Co., Ltd., Shenzhen (CN)

(72) Inventors: Lei Liu, Shenzhen (CN); Xinhang Chen, Shenzhen (CN)

( * ) Notice: Subject to any disclaimer, the term of this patent is extended or adjusted under 35 U.S.C. 154(b) by 1051 days.

(21) Appl. No.: 17/742,368

(22) Filed: May 11, 2022

(65) Prior Publication Data

US 2022/0361708 A1 Nov. 17, 2022

(30) Foreign Application Priority Data

May 11, 2021 (CN) .......................... 202110512038.7

(51) Int. Cl.
*A47J 31/46* (2006.01)
*A47J 31/10* (2006.01)
*B05B 1/18* (2006.01)

(52) U.S. Cl.
CPC .............. *A47J 31/46* (2013.01); *A47J 31/10* (2013.01); *B05B 1/185* (2013.01)

(58) Field of Classification Search
CPC .... A47J 31/10; A47J 31/3671; A47J 31/3676; A47J 31/407; A47J 31/4407; A47J 31/057; A47J 31/0573; A47J 31/0576; A47J 31/103; A47J 31/106; A47J 31/12; B05B 1/185; Y02P 70/50
USPC .......................................... 99/279
See application file for complete search history.

(56) References Cited

U.S. PATENT DOCUMENTS 3,295,998 A * 1/1967 Goros ................. A47J 31/3638
99/295
2006/0266225 A1* 11/2006 Hammad ............ A47J 31/0647
99/279
2014/0013958 A1* 1/2014 Krasne .................. A47J 31/057
99/284
2016/0183717 A1* 6/2016 Ostan ...................... A47J 31/24
99/280

FOREIGN PATENT DOCUMENTS

CN 212281008 U * 1/2021

* cited by examiner

*Primary Examiner* — Topaz L. Elliott
*Assistant Examiner* — Daniel Ward Hatten
(74) *Attorney, Agent, or Firm* — Tsz Lung Yeung

(57) ABSTRACT

This application discloses a shower assembly and a two-in-one coffee machine, including a main structure, a shower head, and a needle assembly. The shower head is mounted on the main structure in a manner that can move relative to the main structure, and the shower head has a first position away from the main structure and a second position close to the main structure. When the shower head is located at the first position, water from a water inlet channel flows out through shower holes. When the shower head is located at the second position, a water outlet channel is in sealed communication with the water inlet channel, a needle outlet is located below the shower head, and water in the water inlet channel flows out through the needle outlet. The shower assembly in the present disclosure can form two spraying paths by switching the position of the shower head.

11 Claims, 12 Drawing Sheets

A

B

120

SHOWER ASSEMBLY AND TWO-IN-ONE COFFEE MACHINE

CROSS REFERENCE

This is a non-provisional application which claims priority to a Chinese patent application having an application number of CN202110512038.7, and a filing date of May 11, 2021, the entire contents of which is hereby incorporated by reference.

TECHNICAL FIELD

This application relates to the technical field of household appliances, and in particular, to a shower assembly and a two-in-one coffee machine.

BACKGROUND

Coffee machines may be classified into two types: drip coffee machines and capsule coffee machines according to different types of brewed coffee. The former can evenly sprinkle water in a large range and brew coffee powder quickly. The latter is convenient to use, can pierce capsule coffee, and can brew coffee with good flavor and taste due to excellent quality guarantee of the capsule coffee.

To cater to users' preferences and take into account different use scenarios, some coffee machines try to integrate the functions of the drip coffee machine and capsule coffee machine into one set of brewing device, that is, the coffee machine has two modes: drip brewing and capsule brewing. Based on this, these coffee machines generally combine all structural modules that can realize drip brewing and capsule brewing together, which leads to the extremely complex structure of related modules of the coffee machines, high cost, difficult assembly, and unsatisfactory brewing effect.

SUMMARY

This application provides a shower assembly and a coffee machine to achieve two modes of drip brewing and capsule brewing through one set of structures.

According to a first aspect, an embodiment provides a shower assembly, including:

a main structure, formed with a water inlet channel;

a shower head, provided with shower holes in communication with the outside, mounted on the main structure in a manner that can move relative to the main structure, and at least having a first position away from the main structure and a second position close to the main structure; and a needle assembly, mounted on the main structure or the shower head, provided with a water outlet channel, and provided with a needle outlet in communication with the water outlet channel, where when the shower head is located at the first position, the water inlet channel is in communication with the shower holes, and water in the water inlet channel flows out through the shower holes; and when the shower head is located at the second position, the water inlet channel is not in communication with the shower holes, the water outlet channel is in sealed communication with the water inlet channel, the needle outlet is located below the shower head, and water in the water inlet channel flows out through the needle outlet.

In an embodiment, the main structure includes an upper cover and a water inlet head, the water inlet head is mounted at a side of the upper cover facing the shower head, the water inlet head forms the water inlet channel, the needle assembly is fixedly connected to the water inlet head, and the water inlet channel and the water outlet channel are provided in communication.

In an embodiment, a cavity in communication with the shower holes is formed between the shower head and the main structure, and the needle assembly has a first end and a second end opposite to each other;

the first end of the needle assembly is fixedly mounted on a side of the main structure facing the cavity, the second end of the needle assembly extends towards a side where the shower head is located, and the water outlet channel and the water inlet channel are provided in communication;

when the shower head is located at the first position, the needle outlet is located inside the cavity, and the cavity is in communication with the water inlet channel through the water outlet channel and the needle outlet, so that the shower holes and the water inlet channel are in communication; and when the shower head is located at the second position, the needle outlet extends out to the outside of the shower head to disconnect the communication between the water outlet channel and the cavity, so that the communication between the shower holes and the water inlet channel is disconnected.

In an embodiment, the needle assembly is movably mounted on the main structure, and when the shower head moves from the first position to the second position, the shower head can act on the main structure to move the needle assembly to a position in sealed communication with the water inlet channel.

In an embodiment, a cavity in communication with the shower holes is formed between the shower head and the main structure, and the needle assembly further has a needle inlet for allowing water to enter the water outlet channel; and the main structure further includes a needle seat accommodated in the cavity, the needle seat is movably mounted on the upper cover, and the needle assembly is mounted on the needle seat;

the needle assembly extends toward a side where the shower head is located, and the needle inlet is located inside the cavity and in communication with the cavity;

when the shower head is located at the first position, a gap is provided between the whole body formed by the needle assembly and the needle seat and a water outlet of the water inlet channel, and the water inlet channel is in communication with the cavity through the gap, so that the water inlet channel is in communication with the shower holes; and when the shower head is located at the second position, the whole body formed by the needle assembly and the needle seat is abutted against the main structure to disconnect the communication between the water inlet channel and the cavity, so that the communication between the shower holes and the water inlet channel is disconnected.

In an embodiment, the shower head is formed with a needle passing hole, when the shower head is located at the first position, an end of the needle assembly away from the main structure can be concealed into the needle passing hole, and when the shower head is located at the second position, the end of the needle assembly away from the main structure can extend out from the needle passing hole.

In an embodiment, the shower head is further provided with a first sealing member, the first sealing member is nested at the periphery of the needle passing hole, a plurality of sealing rings are protruded at the bottom of the first sealing member, the plurality of sealing rings are arranged at intervals from inside to outside, the first sealing member has a first through hole for the needle assembly to pass through, and the hole diameter of the first through hole is smaller than the outer diameter of the needle assembly.

In an embodiment, the needle assembly is mounted on the shower head and extends toward a side of the shower head away from the main structure, the shower head is provided with a through hole, and the shower head is in communication with the water outlet channel in the needle assembly through the through hole; and when the shower head moves from the first position to the second position, the shower head carries the needle assembly to move to a position where the needle assembly is in sealed communication with the water inlet channel.

In an embodiment, the main structure includes an upper cover and a water inlet head, the water inlet head is mounted at a side of the upper cover facing the shower head, the water inlet head forms the water inlet channel, the water inlet channel has a water outlet, a cavity is formed between the main structure and the shower head, the water outlet is in communication with the cavity, and the needle assembly further has a needle inlet for water to enter the water outlet channel;

when the shower head is located at the first position, a gap is provided between the water inlet head and the shower head, and the water inlet channel is in communication with the cavity through the gap, so that the water inlet channel is in communication with the shower holes; and when the shower head is located at the second position, the shower head is abutted against the water inlet head to disconnect the communication between the water inlet channel and the cavity, so that the communication between the shower holes and the water inlet channel is disconnected, and the water outlet of the water inlet channel and the needle inlet of the needle assembly are in sealed communication.

In an embodiment, the main structure further includes a fourth sealing member, the fourth sealing member includes a clamping portion, a water passing portion located at the bottom of the clamping portion, and a water guiding portion around the periphery of the water passing portion, the clamping portion is configured to circumferentially clamp a water outlet of the water inlet head to circumferentially seal the water outlet, the water passing portion has a plurality of water passing holes, and the water guiding portion is constructed into an outwardly expanded structure, so that water passing through the water passing holes can uniformly diffuse along the water guiding portion.

In an embodiment, an elastic telescopic structure is disposed between the upper cover and the shower head, so that the shower head can switch between the first position and the second position relative to the upper cover.

According to a second aspect, an embodiment provides a two-in-one coffee machine, including a base and the shower assembly according to the first aspect.

The embodiments of the present disclosure have the following beneficial effects:

According to the shower assembly and the two-in-one coffee machine in the foregoing embodiments, the shower assembly can allow the coffee machine to switch between two modes of drip brewing and capsule brewing by switching the shower head between the first position and the second position. Specifically, when capsule coffee is brewed, the shower head is squeezed from bottom to top by the capsule coffee after the cover of the shower assembly. In this case, the shower head moves from the first position to the second position, the needle assembly and the water inlet channel are in sealed communication, and the needle outlet is located below the shower head. In addition, the needle pierces the capsule coffee, and water in the water inlet channel is sprayed through the needle outlet, to achieve the capsule brewing mode. When coffee powder is brewed, the shower head is not squeezed. In this case, the shower head works at the first position, and water in the water inlet channel flows to the shower head and is sprayed through the shower head, to achieve the drip brewing mode. The shower assembly in embodiments of the present disclosure can form two spraying paths by switching the position of the shower head, so as to adapt to two brewing modes. The shower assembly has a simple structure and low costs, and is easy to be assembled.

BRIEF DESCRIPTION OF THE DRAWINGS

To explain the embodiments of the present disclosure or the technical solutions of the prior art more clearly, the accompanying drawings to be used in the description of the embodiments or the prior art will be briefly described below. Clearly, the accompanying drawings in the following description are only some embodiments of the present disclosure, and a person of ordinary skill in the art may further obtain other drawings based on these accompanying drawings without creative efforts.

SYMBOL DESCRIPTION OF MAIN ELEMENTS

Figure 1:
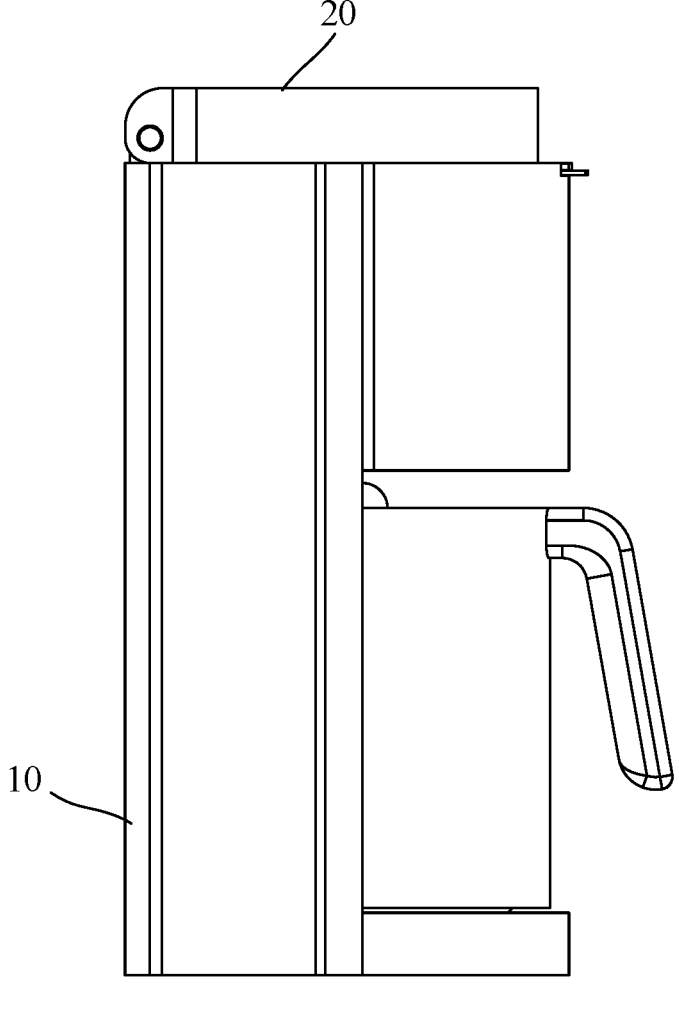
FIG. 1 is a schematic structural diagram of a two-in-one coffee machine according to an embodiment.

100—main structure; 101—water inlet channel; 101*a*— water outlet; 110—first upper cover; 120—water inlet head; 130—second upper cover; 140—needle seat; 150—second sealing member; 160—third upper cover;

170—fourth sealing member; 180—support plate; 111—mounting protrusion; 112—cover portion; 113—extension portion; 121—water inlet; 122—water inlet section; 123—water delivery section; 124—connection portion; 131—second water inlet portion; 171—clamping portion; 172—water passing portion; 173—water guiding portion; 1131—support portion; 1221—convex; 1241—connection groove; 1721—water passing hole; 1131a—opening;

200—shower head; 210—first lower cover; 220—first sealing member; 230—second lower cover; 240—third sealing member; 250—low-lying portion; 211—first needle passing hole; 212—force-bearing portion; 213—flange; 214—first shower hole; 221—sealing ring; 222—first through hole; 231—second needle passing hole; 232—second shower hole; 241—second through hole;

300—needle; 310—first tip; 320—needle tube; 330—second tip; 321—needle tube flow channel; 322—needle outlet; 323—needle inlet;

400—first elastic telescopic structure; 410—first elastic member; 420—first guiding post;

500—second elastic telescopic structure; 510—second elastic member; 520—second guiding post; 530—limit member;

600—third elastic telescopic structure; 610—third elastic member; 620—second guiding seat; 630—second guiding protrusion;

700—fourth elastic telescopic structure; 710—fourth elastic member; 720—fourth guiding post; 800—fifth sealing member;

10—base; 11—body; 12—support device; 13—kettle; 11a—assembly cavity; 11b—kettle accommodating cavity; 11c—limit groove; 11d—handheld portion accommodating groove; 11e—rotation base; 12a—bracket; 12b—capsule cup; 12c—handheld portion; 12a1—long column; 12a2—limit protrusion;

20—shower assembly; 21—lug; and

30—capsule coffee.

DETAILED DESCRIPTION OF THE PREFERRED EMBODIMENT

For easy understanding of this application, a more complete description of this application will be given below with reference to the associated drawings. Preferred embodiments of the present disclosure are given in the drawings. However, this application can be implemented in many different forms and is not limited to the embodiments described herein. On the contrary, the embodiments are provided for a more thorough understanding of the content recited in this application.

It should be noted that when an element is called "fixed" to another element, it can be directly on the other element or there can also be a centered element. When an element is considered to be "connected" to another element, it may be directly connected to the other element or may be accompanied by a centering element. The terms "vertical", "horizontal", "left", "right" and similar expressions used herein are for illustrative purposes only.

Unless otherwise defined, all technical and scientific terms used herein have the same meaning as would normally be understood by those skilled in the art of this application. The terms used in this application are only for describing specific embodiments, and are not intended to limit this application. The term "and/or" as used herein includes any and all combinations of one or more of the related listed items.

The embodiments of the present disclosure provide a two-in-one coffee machine. The two-in-one coffee machine (referred to as "coffee machine" below) has two brewing modes: drip brewing and capsule brewing, which are respectively used for brewing coffee powder and capsule coffee.

Figure 2:
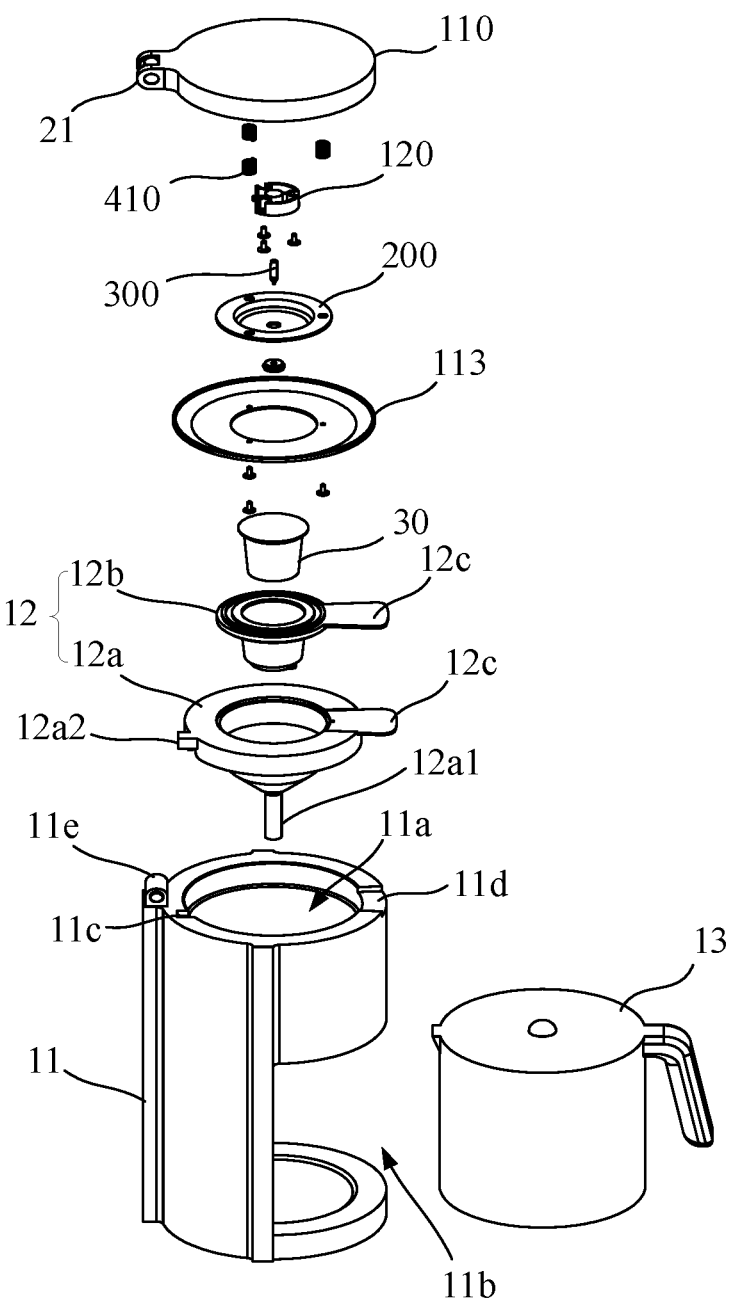
FIG. 2 is a schematic explosion diagram of a two-in-one coffee machine according to an embodiment.

Referring to FIG. 1 and FIG. 2, the coffee machine includes a base 10 and a shower assembly 20 rotatably mounted on the base 10, and the rotatable arrangement of the shower assembly 20 on the base 10 achieves the purpose of opening and closing the base 10.

It can be understood that, when capsule coffee 30 is placed on the base 10, the shower assembly 20 can pierce the capsule coffee 30 while the shower assembly 20 is closed to the base 10, and the shower assembly 20 is switched into the capsule brewing mode at the same time, so as to brew the capsule coffee 30. When coffee powder is placed on the base 10, the shower assembly 20 is switched into the drip brewing mode, so as to brew the coffee powder.

The base 10 includes a body 11, a support device 12 (when the coffee power is brewed, the support device 12 may not be provided or may be changed into another structure that can contain the coffee powder), and a kettle 13. The body 11 is generally designed in an upright cylindrical shape (certainly, or may be in other shapes). An assembly cavity 11a is provided at a top portion of the body 11, and a kettle accommodating cavity 11b in communication with the assembly cavity 11a is provided at a lower portion of the body 11. The support device 12 is detachably mounted in the assembly cavity 11a. The capsule coffee 30 (or ordinary coffee) may be placed in the support device 12. The kettle 13 may be placed in the kettle accommodating cavity 11b. The support device 12 is directly in communication with the kettle 13. The capsule coffee 30 is brewed in the support device 12 and then enters the kettle 13.

The support device 12 may include a bracket 12a and a capsule cup 12b. The bracket 12a and the capsule cup 12b each have a handheld portion 12c. When the capsule cup 12b is placed in the bracket 12a, the two handheld portions 12c overlap for a user to hold and place the two into the assembly cavity 11a. The capsule cup 12b is used for accommodating and limiting the capsule coffee 30. The bracket 12a is used for supporting the capsule cup 12b. In addition, a long column 12a1 for liquid to pass through is provided at the bottom of the bracket 12a, and the long column 12a1 extends into the kettle 13.

To improve the stability of the support device 12 on the body 11, a limit protrusion 12a2 is further formed at the outer edge of the bracket 12a, and a limit groove 11c that can accommodate the limit protrusion 12a2 is provided at the corresponding position of the body 11. After the bracket 12a is placed on the body 11, the limit protrusion 12a2 is caught in the limit groove 11c, so that the bracket 12a can be prevented from moving circumferentially on the body 11.

In addition, a handheld portion accommodating groove 11d may be further provided on the body 11. The handheld portions 12c of the capsule cup 12b and the bracket 12a may be accommodated in the handheld portion accommodating groove 11d to further stabilize the support device 12 on the body 11.

A rotation base 11e is further provided at a side of a top position of the body 11, and the rotation base 11e is a hollow column. In addition, a pair of lugs 21 with through holes that can be clamped to the rotation base 11e are provided at the corresponding position of the shower assembly 20. In this case, the shower assembly 20 can be rotatably mounted on the base 10 by passing a rotating shaft through the lugs 21 and the rotation base 11e successively.

In addition to the foregoing manner, to mount the shower assembly 20, the lug 21 may be designed to have no through hole, and a protrusion may be provided at the opposite side to be clamped onto the rotation base 11e. In this case, the protrusion acts as the foregoing rotating shaft.

Referring to FIG. 2 to FIG. 7, the shower assembly 20 in the embodiments of the present disclosure includes a main structure 100, a shower head 200, and a needle assembly 300.

The main structure 100 is formed with a water inlet channel 101. The shower head 200 has shower holes (referring to first shower holes 214 and second shower holes 232 below). The shower head 200 is mounted on the main structure 100 in a manner that can move relative to the main structure 100, and the shower head 200 at least has a first position away from the main structure 100 and a second position close to the main structure 100. The needle assembly 300 is mounted on the main structure 100 or the shower head 200. The needle assembly 300 is provided with a water outlet channel. The needle assembly 300 is provided with a needle outlet 322 in communication with the water outlet channel. When the shower head 200 is located at the first position, the water inlet channel 101 is in communication with the shower holes, and water in the water inlet channel 101 flows out through the shower holes of the shower head 200 to achieve spraying. When the shower head 200 is located at the second position, the water inlet channel 101 is not in communication with the shower holes, the water outlet channel is in sealed communication with the water inlet channel 101, that is, the needle assembly 300 is in communication with the inside of the water inlet channel 101 and the connection between the two is a circumferential sealed connection, the needle outlet 322 is located below the shower head 200, and water in the water inlet channel 101 flows out through the needle outlet 322 to achieve spraying.

Figure 3:
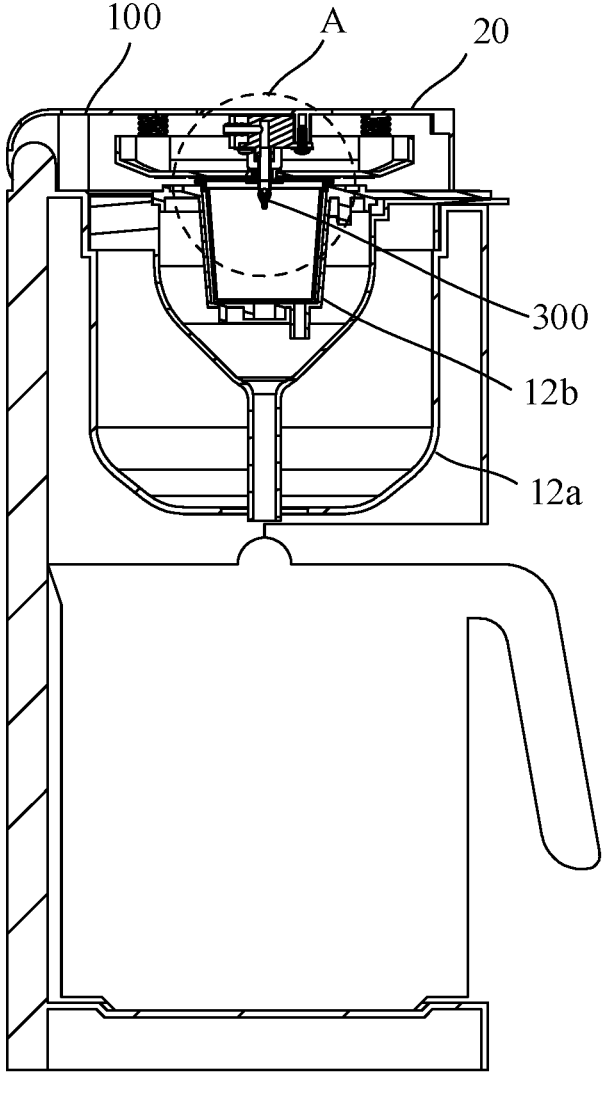
FIG. 3 is a cross-sectional view of a shower assembly in a closed state according to an embodiment.
Figure 4:
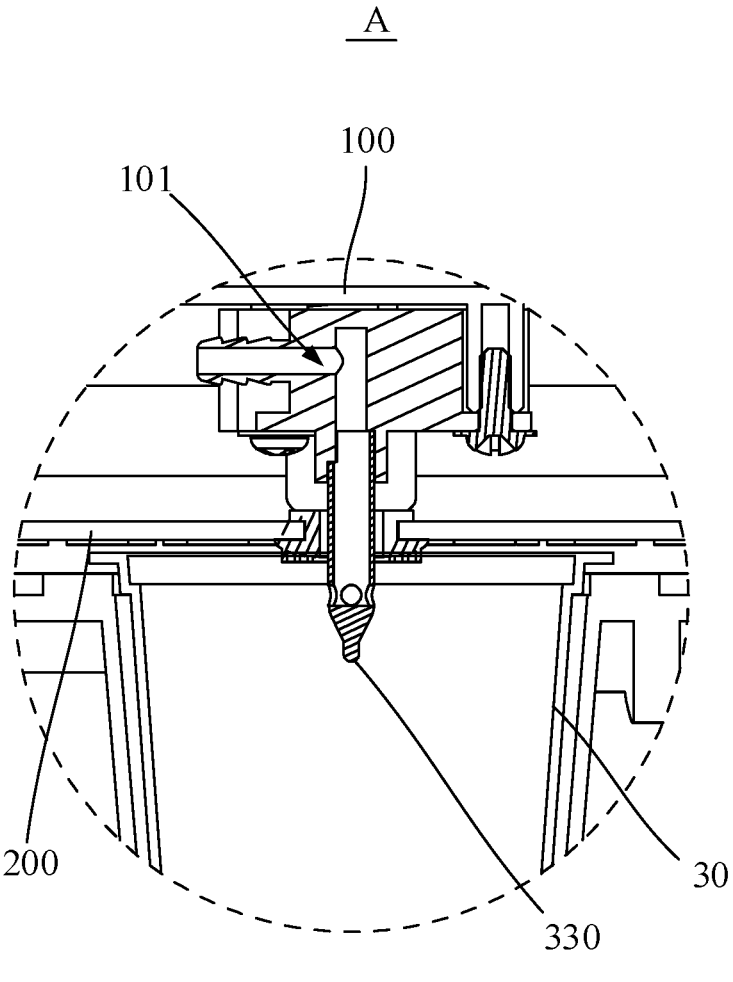
FIG. 4 is a partial enlarged view at A in FIG. 3.
Figure 5:
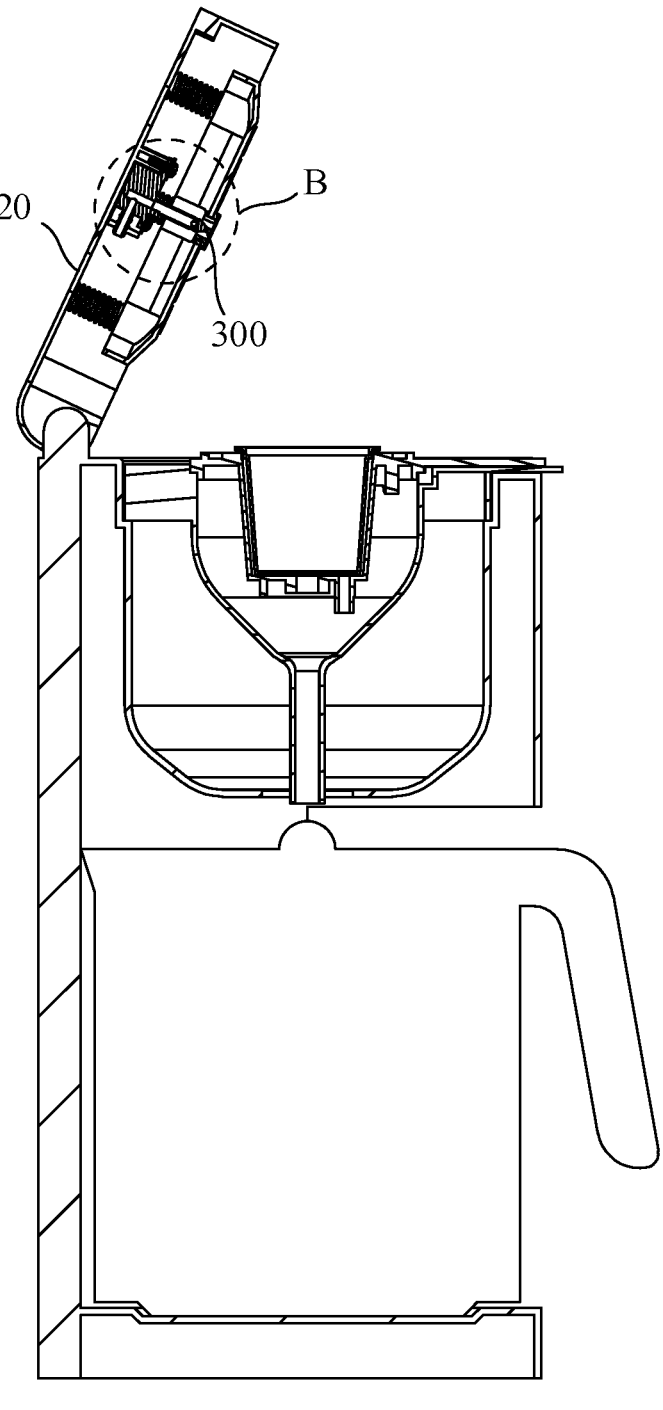
FIG. 5 is a cross-sectional view of a shower assembly in an open state according to an embodiment.
Figure 6:
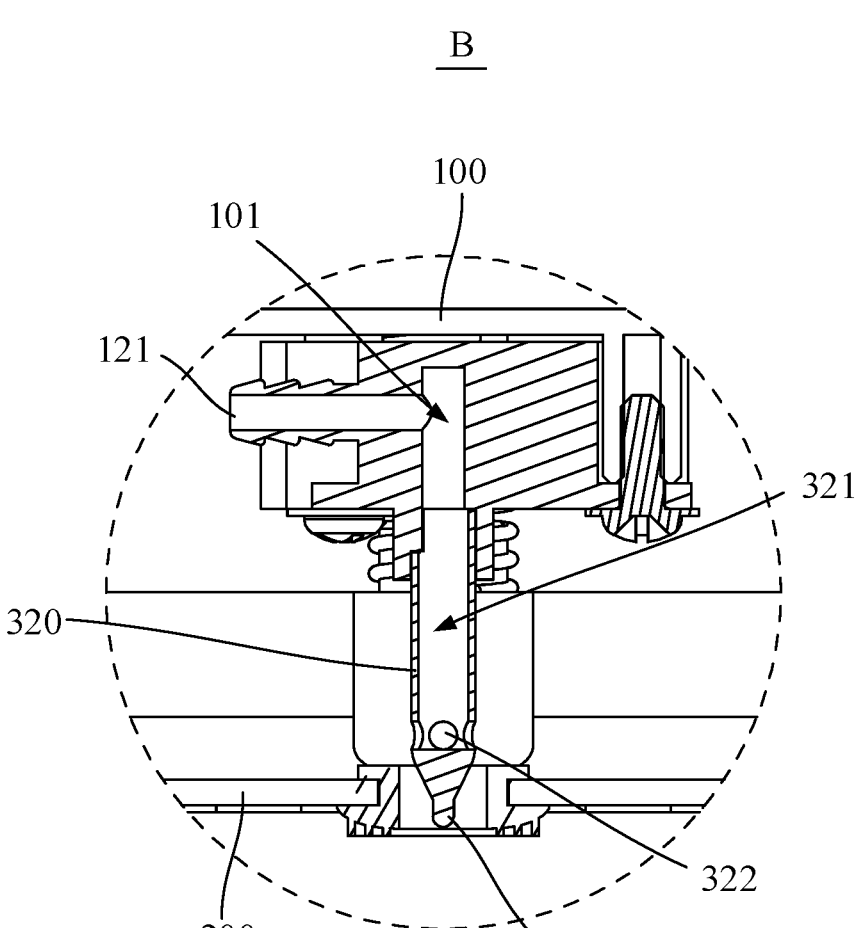
FIG. 6 is a partial enlarged view at B in FIG. 5.

In the embodiments of the present disclosure, the shower assembly 20 not only serves as a cover of the coffee machine, but also has the function of a shower to brew coffee. The shower assembly 20 can allow the coffee machine to switch between two modes of drip brewing and capsule brewing by switching the shower head 200 between the first position and the second position. Specifically, as shown in FIG. 3 and FIG. 4, when capsule coffee 30 is brewed, the shower head 200 is squeezed from bottom to top by the capsule coffee 30 when the shower assembly 20 is in a closed state. In this case, the shower head 200 moves from the first position to the second position, the needle assembly 300 and the water inlet channel 101 are in sealed communication, and the needle outlet 322 runs through the shower head 200. In addition, the needle assembly 300 pierces the capsule coffee 30, and water in the water inlet channel 101 is sprayed through the needle outlet 322, to achieve the capsule brewing mode; as shown in FIG. 5 and FIG. 6, when ordinary coffee powder is brewed, the shower head 200 is not squeezed. In this case, the shower head 200 works at the first position, and water in the water inlet channel 101 flows to the shower head 200 and is sprayed through the shower head 200, to achieve the drip brewing mode. The shower assembly 20 in embodiments of the present disclosure can form two spraying paths by switching the position of shower head 200, so as to adapt to two brewing modes. The shower assembly 20 has a simple structure and low costs, and is easy to be assembled.

In addition, when the needle assembly 300 is mounted on the main structure 100, the needle assembly 300 may alternatively be designed to be concealed into and protruded from the shower assembly 20 by switching the shower head 200 between the first position and the second position.

In this case, it can be understood that the needle assembly 300 is concealed in the shower head 200 when the shower head 200 is at the first position, and the needle assembly 300 is protruded from the shower head 200 when the shower head 200 is at the second position.

As shown in FIG. 3 and FIG. 4, the shower head 200 is squeezed by the capsule coffee 30 when the shower assembly 20 is in a closed state. In this case, the shower head 200 moves from the first position to the second position, at the same time, the needle assembly 300 protrudes from the shower head 200 to pierce the capsule coffee 30, and then the coffee is brewed with water flowing out of the water inlet channel 101 and the needle assembly 300 successively. As shown in FIG. 5 and FIG. 6, the shower head 200 is not squeezed when the shower assembly 20 is in an open state. In this case, the shower head 200 is switched to the first position, and the needle assembly 300 is concealed in the shower head 200, which can avoid a prick caused by being in contact with the needle assembly 300 due to the user's misoperation, thereby improving the use safety of the coffee machine. In addition, when the needle assembly 300 is concealed in the shower head 200, the coffee machine has a better looking because of its neatness.

In a first type of embodiments, referring to FIG. 2 to FIG. 7, the needle assembly 300 is fixedly mounted on the main structure 100, and the needle assembly 300 and the water inlet channel 101 are always in sealed communication.

In this case, it can be understood that the way directly fixedly mounting the needle assembly 300 on the main structure 100 can omit or simplify the structural design for achieving sealing.

In a specific embodiment, the main structure 100 includes a first upper cover 110, a first water inlet portion (the related drawing of the first water inlet portion may refer to a second water inlet portion 131 below for understanding) is formed at a side of the first upper cover 110 facing the shower head 200, the first water inlet portion forms the water inlet channel 101, and the needle assembly 300 is connected to the first water inlet portion.

The first upper cover 110 may be manufactured by injection molding. In this case, the first upper cover 110 and the first water inlet portion are integrated. In addition, in the process of injection molding, the needle assembly 300 may be used as an embedded part to directly connect to the first water inlet portion after the injection molding.

The water inlet channel 101 formed from the first water inlet portion is in communication with the outside. When an end of the water inlet channel 101 located at the outside is connected to a part that can convey liquid, such as a water conveying hose, water for brewing coffee can be conveyed into the water inlet channel 101.

Figure 7:
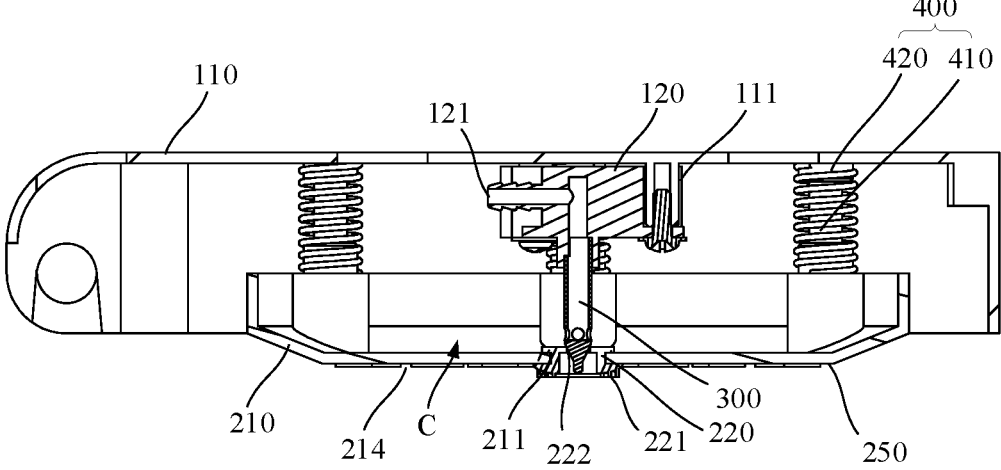
FIG. 7 is a schematic structural diagram of a shower head at a first position according to an embodiment.

In another specific embodiment, referring to FIG. 2, FIG. 6, and FIG. 7, the main structure 100 includes an upper cover and a water inlet head 120. For easy distinction, the upper cover here is the first upper cover 110. The water inlet head 120 is mounted at a side of the first upper cover 110 facing the shower head 200, the water inlet head 120 forms the water inlet channel 101, the needle assembly 300 is fixedly connected to the water inlet head 120, and the water inlet channel 101 and the water outlet channel are provided in communication.

The water inlet head 120, as a transition member between the first upper cover 110 and the needle assembly 300, is mounted on the first upper cover 110 as a separate member. On the one hand, it is convenient to maintain and replace the water inlet head 120 later, for example, dredging the water inlet channel 101 in the water inlet head 120. On the other hand, the water inlet head 120 is integrally located inside the main structure 100, so that a water conveying hose can be directly in communication with the water inlet head 120 from the inside of the main structure 100 to conceal the water conveying hose into the main structure 100, so as to change the water conveying mode.

The water inlet channel 101 formed from the water inlet head 120 forms a water inlet 121 inside the main structure 100. When the water inlet 121 is connected to a part that can convey liquid, such as a water conveying hose, water for brewing coffee can be conveyed into the water inlet channel 101.

The water inlet head 120 may be manufactured by injection molding. In addition, in the process of injection molding, the needle assembly 300 may be used as an embedded part to directly connect to the water inlet head 120 after the injection molding. In this case, the water inlet head 120 and the needle assembly 300 are integrated.

In the embodiment provided with the water inlet head 120, a cavity (referring to numeral C in FIG. 7) in communication with the shower holes is formed between the shower head 200 and the main structure 100, and the needle assembly 300 has a first end and a second end opposite to each other; the first end of the needle assembly 300 is fixed on a side of the main structure 100 facing the cavity, the second end of the needle assembly 300 extends towards a side where the shower head 200 is located, and the water outlet channel and the water inlet channel 101 are provided in communication; when the shower head 200 is located at the first position, the needle outlet 322 is located inside the cavity, and the cavity is in communication with the water inlet channel 101 through the water outlet channel and the needle outlet 322, so that the shower holes and the water inlet channel 101 are in communication; and when the shower head 200 is located at the second position, the needle outlet 322 extends out to the outside of the shower head 200 to disconnect the communication between the water outlet channel and the cavity, so that the communication between the shower holes and the water inlet channel 101 is disconnected.

Figure 8:
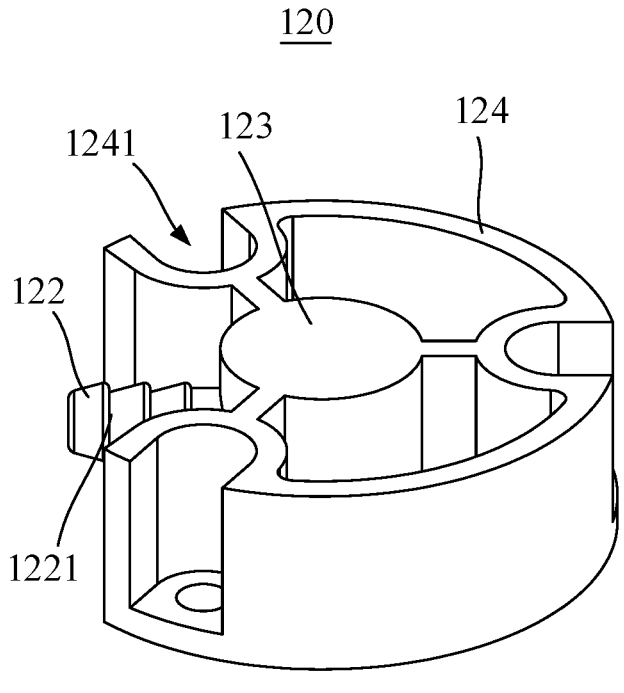
FIG. 8 is a schematic structural diagram of a water inlet head according to an embodiment.

In a more specific embodiment, referring to FIG. 2, FIG. 7, and FIG. 8, the water inlet head 120 is generally annular and has a water inlet section 122, a water delivery section 123, and a connection portion 124 surrounding the periphery of the water delivery section 123. The water inlet section 122 and the water delivery section 123 together form the water inlet channel 101. The connection portion 124 is used for connecting the water inlet head 120 to the first upper cover 110.

Specifically, the water delivery section 123 is a hollow column with an opening at a lower end, and the water inlet section 122 is a hollow column. The hollow communication between the water inlet section 122 and the water delivery section 123 forms the water inlet channel 101. The water inlet section 122 is hollow inside and the outer surface of the water inlet section 122 is formed with a plurality of convexes 1221 arranged at intervals to connect a water conveying hose. Water can enter the needle assembly 300 through the water inlet section 122 and the water delivery section 123 successively.

The connection portion 124 includes a plurality of connection grooves 1241 provided at uniform intervals in the circumferential direction. The connection groove 1241 extends in the axial direction of the water inlet head 120, and the connection groove 1241 has a semicircular cross section in the radial direction of the water inlet head 120 (or may be a circular groove or a groove in other shapes). A threaded mounting hole is provided at the bottom of the connection groove 1241. A surface of the first upper cover 110 facing the shower head 200 has a plurality of mounting protrusions 111. The mounting protrusion 111 can be accommodated in the connection groove 1241. Then, the water inlet head 120 can be mounted on the first upper cover 110 by screwing fasteners such as screws to the threaded mounting hole and the mounting protrusion 111.

It should be noted here that, as a preferred manner, the connection groove 1241 and the mounting protrusion 111 have a corresponding quantity relationship, for example, when the quantity of the connection grooves 1241 is three, the quantity of the mounting protrusions 111 is also correspondingly three.

In a specific embodiment, referring to FIG. 2, FIG. 4, FIG. 6, and FIG. 7, the shower head 200 is formed with a first lower cover 210, the first lower cover 210 is formed with a first needle passing hole 211, the needle assembly 300 can be concealed into the first needle passing hole 211 and protruded from the first needle passing hole 211, and the first lower cover 210 has a plurality of first shower holes 214.

In the process of covering the shower assembly 20, in the capsule brewing mode, referring to FIG. 4 and FIG. 7, the capsule coffee 30 acts on the first lower cover 210 to enable the first lower cover 210 to move toward the first upper cover 110, that is, to switch from the first position to the second position. In addition, an end of the needle assembly 300 away from the main structure is switched from the position concealed into the first needle passing hole 211 to the position protruded from the first needle passing hole 211. In this case, water in the water inlet channel 101 is sprayed into the capsule coffee 30 through the needle outlet 322 of the needle assembly 300. In the drip brewing mode, referring to FIG. 6 and FIG. 7, the first lower cover 210 is kept at the first position, and the needle assembly 300 is concealed into the first needle passing hole 211. In this case, water in the water inlet channel 101 flows from the needle outlet 322 to the first lower cover 210, and is then sprayed through the plurality of first shower holes 214 of the first lower cover 210.

In a more specific embodiment, referring to FIG. 2 and FIG. 7, the shower head 200 further includes a first sealing member 220, the first sealing member 220 is nested at the periphery of the first needle passing hole 211, a plurality of sealing rings 221 are protruded at the bottom of the first sealing member 220, the plurality of sealing rings 221 are arranged at intervals from inside to outside, the first sealing member 220 has a first through hole 222 for the needle assembly 300 to pass through, and the hole diameter of the first through hole 222 is smaller than the outer diameter of the needle assembly 300.

The sealing ring 221 at the bottom of the first sealing member 220 can be closely attached to a surface of the capsule coffee 30, and two sealing structures can be formed between the capsule coffee 30 and the first lower cover 210 by designing the hole diameter of the first through hole 222 to be smaller than the outer diameter of the needle assembly 300, so that water in the capsule coffee 30 cannot pass through the first lower cover 210 or enter the shower assembly 20.

Specifically, the first sealing structure is formed by abutting the sealing ring 221 against the surface layer of the capsule coffee 30, and the second sealing structure is formed by abutting the outer wall of the needle assembly 300 against the hole wall of the first through hole 222. The two sealing structures block all paths through which water can return.

In a specific embodiment, referring to FIG. 2 and FIG. 7, the shower assembly 20 further includes a first elastic telescopic structure 400 disposed between the first upper cover 110 and the first lower cover 210, so that the first lower cover 210 can switch between the first position and the second position relative to the first upper cover 110.

In this case, the first lower cover 210 can be spontaneously reset from the second position to the first position by using the elastic reset performance of the first elastic telescopic structure 400, that is, when the shower assembly 20 is opened, the first lower cover 210 can be reset under the action of the first elastic telescopic structure 400 because the force on the first lower cover 210 by the capsule coffee 30 disappears.

Certainly, in some embodiments, the first lower cover 210 may be switched back and forth between the first position and the second position only by external force without disposing the first elastic telescopic structure 400.

In a more specific embodiment, referring to FIG. 2 and FIG. 7, the first elastic telescopic structure 400 includes a first elastic member 410 disposed between the first upper cover 110 and the first lower cover 210.

The first elastic member 410 may be a member having an elastic reset performance, such as a telescopic spring, a silica gel, and a rubber.

Further, in some embodiments, referring to FIG. 2 and FIG. 7, the first elastic telescopic structure 400 further includes a first guiding post 420 disposed between the first upper cover 110 and the first lower cover 210, the first guiding post 420 can be protruded from one of the first upper cover 110 and the first lower cover 210, and the first elastic member 410 is sleeved on the first guiding post 420.

The first guiding post 420 may be used as a part of the first upper cover 110 or the first lower cover 210. An example in which the first guiding post 420 is used as a part of the first upper cover 110 is used, the first guiding post 420 extends from the first lower cover 210, so that the first lower cover 210 can move along the first guiding post 420, and the first guiding post 420 guides the first lower cover 210.

Alternatively, the first guiding post 420 may be a separate part, and then connected to the first upper cover 110 or the first lower cover 210 by a subsequent connection process.

In some other embodiments (the related drawing herein may refer to a third elastic telescopic structure 600 below), the first elastic telescopic structure 400 may include a first guiding seat provided on the first upper cover 110 and a first guiding protrusion provided on the first lower cover 210. The first guiding protrusion can be accommodated into the first guiding seat, and a gap for accommodating the first elastic member 410 is required between the first guiding protrusion and the first guiding seat.

When the first lower cover 210 is switched from the first position to the second position, the first guiding protrusion is inserted into the first guiding seat, and the first elastic member 410 is gradually contracted into the gap between the first guiding protrusion and the first guiding seat. In this embodiment, the first guiding protrusion and the first guiding seat function as the first guiding post 420 in the foregoing embodiment to guide the first lower cover 210. However, it is different from the foregoing embodiment that the first guiding protrusion and the first guiding seat herein are all located between the first upper cover 110 and the first lower cover 210 without extending from the first upper cover 110 or the first lower cover 210.

It is to be understood that positions of the first guiding protrusion and the first guiding seat may be interchangeable, that is, the first guiding protrusion may be provided on the first upper cover 110, and the first guiding seat may be provided on the first lower cover 210.

To achieve the function of the first upper cover 110, the first lower cover 210, the needle assembly 300, and the first elastic telescopic structure 400 and complete the assembly between the components, the first upper cover 110 and the first lower cover 210 may be implemented by using one of the following example structures, but it can be understood that the first upper cover 110 and the first lower cover 210 are not limited to the following example structures.

Figure 9:
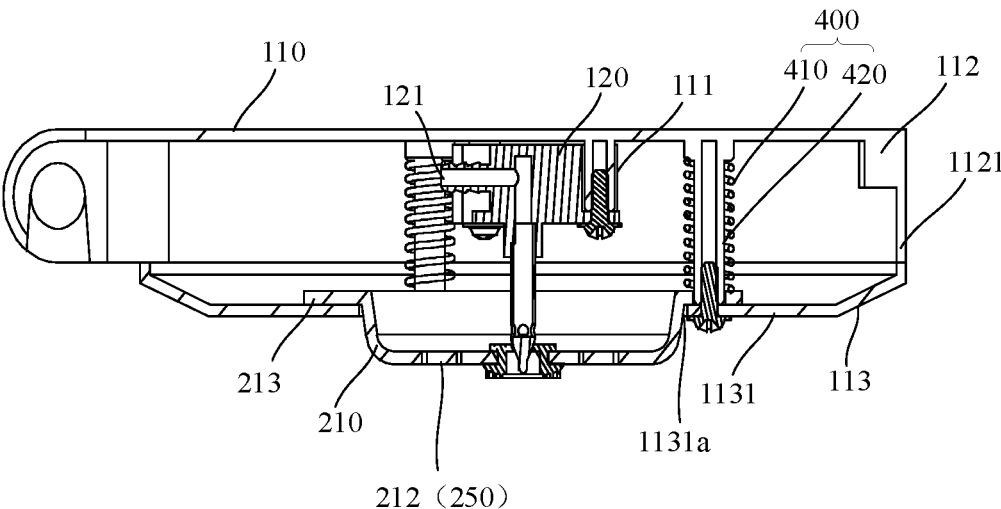
FIG. 9 is a schematic structural diagram of a shower head at a first position according to an embodiment.

As a first example, referring to FIG. 2 and FIG. 9, the first upper cover 110 includes a cover portion 112 and an extension portion 113. The cover portion 112 has a side cover surface 1121 extending toward a side where a lower cover structure 200 is located. The extension portion 113 extends from outside to inside along an edge of the side cover surface 1121 to form a support portion 1131 opposite to the cover portion 112. The support portion 1131 encloses an opening 1131a. The first guiding post 420 is provided between the cover portion 112 and the extension portion 113. The first lower cover 210 includes a force-bearing portion 212 and a flange 213 located at an edge of the force-bearing portion 212. The flange 213 is sleeved on the first guiding post 420 and provided corresponding to the support portion 1131. The force-bearing portion 212 is provided corresponding to the opening 1131a.

It should be understood herein that, when the first lower cover 210 is at the first position, the force-bearing portion 212 protrudes from the opening 1131a, so that the force-bearing portion 212 can be switched from the first position to the second position by the force of the capsule coffee 30.

In this example, the cover portion 112 and the extension portion 113 may be integrated or may be separated. In this example, when the first lower cover 210 is at the first position, the flange 213 may be supported on the support portion 1131, and in this case, the first lower cover 210 can be kept at the first position by using the first elastic member 410. In addition, in this example, the first guiding post 420 is located between the cover portion 112 and the support portion 1131, and the first guiding post 420 may not extend out of the first upper cover 110 or the support portion 1131 to achieve the guiding function. Moreover, an example in which the first guiding post 420 is formed on the first upper cover 110 is used, the first upper cover 110 may be made more compact in structure by passing a screw through the support portion 1131 and locking the support portion 1131 on the first guiding post 420. When the force-bearing portion 212 is stressed to enable the flange 213 to drive the first elastic member 410 to compress, the flange 213 and the first elastic member 410 together move upward relative to the first guiding post 420 away from the support portion 1131.

As another example (the related drawing herein may refer to a second upper cover 130 and a second lower cover 230 below), one of the first upper cover 110 and the first lower cover 210 may be a flat plate structure, and the other may be a structure with a substantially concave cross section.

In a second type of embodiments, referring to FIG. 10 to FIG. 13, the needle assembly 300 is movably mounted on the main structure 100, and when the shower head 200 moves from the first position to the second position, the shower head 200 can act on the main structure 100 to move the needle assembly 300 to a position in sealed communication with the water inlet channel 101.

In the second type of embodiments, when the shower head 200 is switched between the first position and the second position, the needle assembly 300 also moves a certain distance, so that the overall stroke of the needle assembly 300 can be increased to make it more easier to conceal the needle assembly 300.

Figure 10:
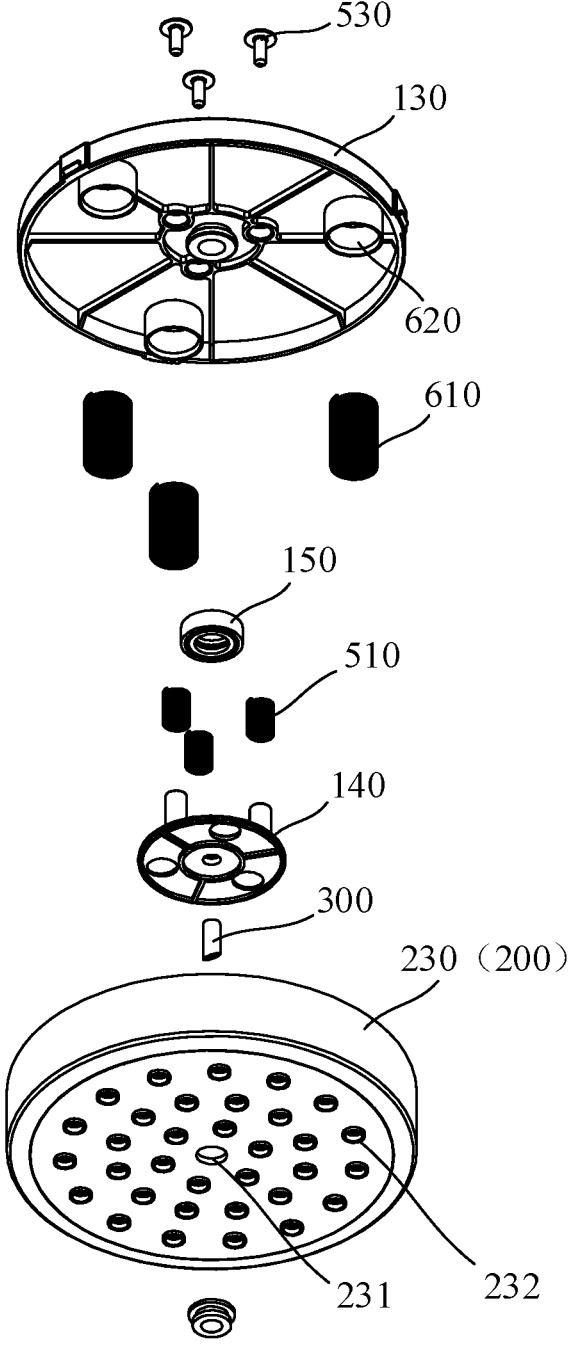
FIG. 10 is a schematic explosion diagram of a shower assembly according to an embodiment.
Figure 11:
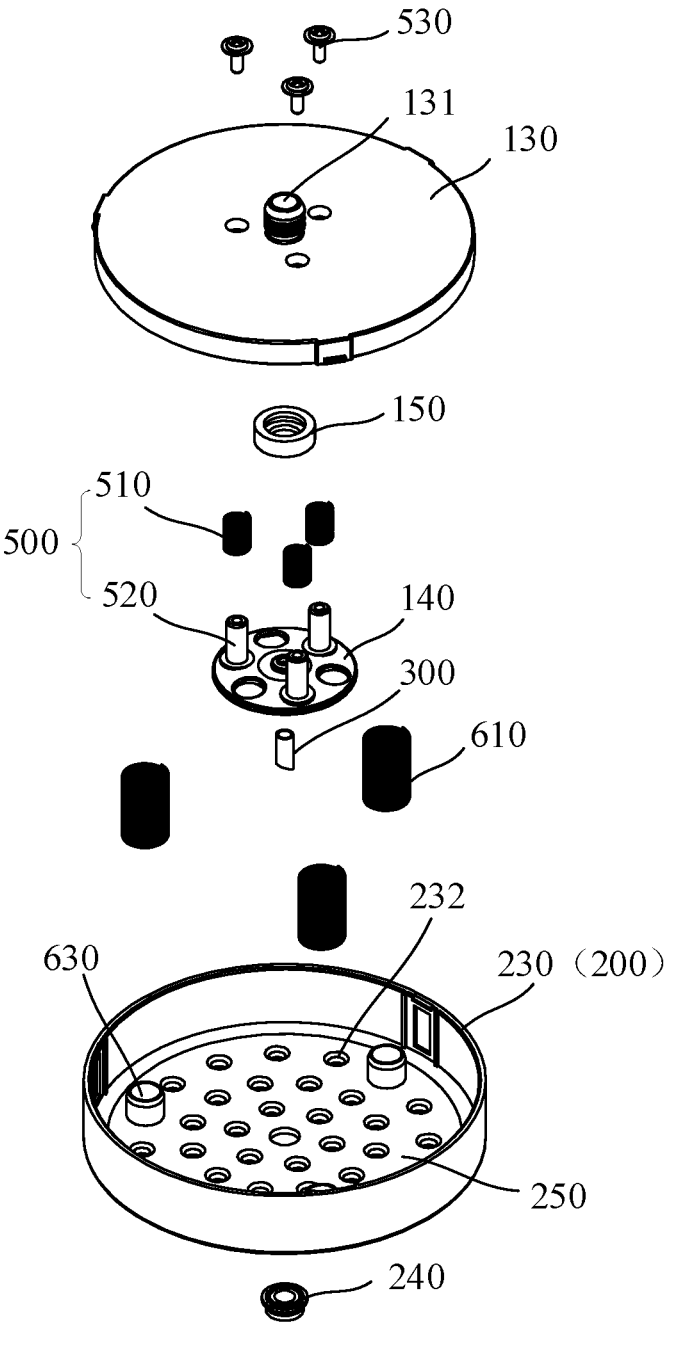
FIG. 11 is another schematic explosion diagram of a shower assembly according to an embodiment.

In a specific embodiment, referring to FIG. 10 and FIG. 11, the main structure 100 includes an upper cover and a needle seat 140. For easy distinction, the upper cover is the second upper cover 130. The needle seat 140 is movably mounted on the second upper cover 130, and the needle assembly 300 is mounted on the needle seat 140.

It is different from the first type of embodiments above that, in the second type of embodiments, a cavity (referring to numeral D in FIG. 13) in communication with the shower holes is formed between the shower head 200 and the main structure 100, and the needle assembly 300 further has a needle inlet for water to enter the water outlet channel; the needle seat 140 is accommodated in the cavity; the needle assembly 300 extends toward a side where the shower head 200 is located, and the needle inlet is located inside the cavity and in communication with the cavity; when the shower head 200 is located at the first position, a gap (referring to numeral E in FIG. 13) is provided between the whole body formed by the needle assembly 300 and the needle seat 140 and a water outlet of the water inlet channel 101, and the water inlet channel 101 is in communication with the cavity through the gap, so that the water inlet channel 101 is in communication with the shower holes; and when the shower head 200 is located at the second position, the whole body formed by the needle assembly 300 and the needle seat 140 is abutted against the main structure 100 to disconnect the communication between the water inlet channel 101 and the cavity, so that the communication between the shower holes and the water inlet channel 101 is disconnected.

It should be noted here that, to achieve the movable assembly between the needle seat 140 and the second upper cover 130, a second elastic telescopic structure 500 may be provided between the second upper cover 130 and the needle seat 140.

Specifically, a plurality of second guiding posts 520 are disposed circumferentially on the needle seat 140, the plurality of second guiding posts 520 can pass through the second upper cover 130, a second elastic member 510 is sleeved on the second guiding post 520, and the second elastic member 510 and the second guiding post 520 form the second elastic telescopic structure 500.

When the shower head 200 acts on the needle seat 140, the shower head 200 can drive the needle seat 140 to move toward the second upper cover 130, and the second guiding post 520 passes through the second upper cover 130.

Further, a limit member 530 such as a screw with washer may be fitted at an end of the second guiding post 520 that can pass through the second upper cover 130, so that the needle seat 140 is pulled by the limit member 530 such as a screw with washer to keep at the current position without the action of the shower head 200.

Certainly, the second guiding post 520 may alternatively be formed on the second upper cover 130, and in this case, the second guiding post 520 extends out of the needle seat 140. In this case, the limit member 530 such as a screw with washer may be fitted on the second guiding post 520 to support the needle seat 140 to keep the needle seat 140 at the current position.

Figure 12:
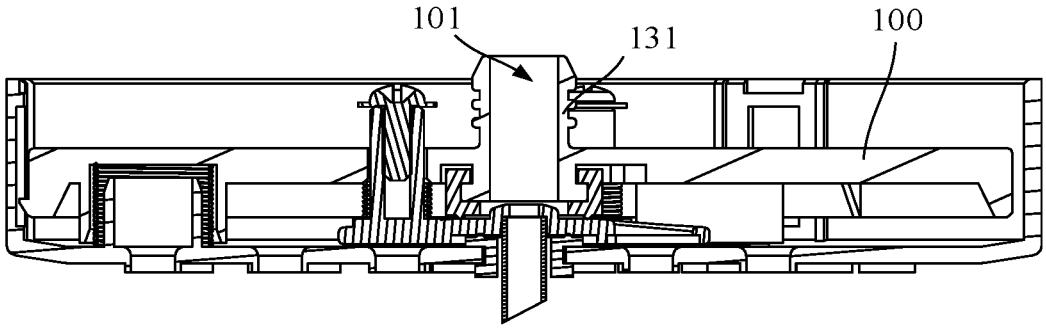
FIG. 12 is a schematic structural diagram of a shower head at a second position according to an embodiment.

Referring to FIG. 11 and FIG. 12, a second water inlet portion 131 is formed at a side of the second upper cover 130 facing the shower head 200, the second water inlet portion 131 forms the water inlet channel 101, and a second sealing member 150 is sleeved on the outer periphery of the second water inlet portion 131.

The specific forming mode and configuration of the second upper cover 130 and the second water inlet portion 131 may refer to the description of the first upper cover 110 above. Details are not described herein again. In addition, the second upper cover 130 may alternatively be designed into a configuration including the water inlet head 120.

The second sealing member 150 can form a sealed assembly between the needle seat 140 and the water inlet channel 101, so that the needle assembly 300 mounted on the needle seat 140 and the water inlet channel 101 can form sealed communication when the shower head 200 moves to the second position.

In a specific embodiment, referring to FIG. 10 and FIG. 11, the shower head 200 includes the second lower cover 230. In this case, the shower head 200 is formed with the second lower cover 230, the second lower cover 230 is formed with a second needle passing hole 231, the needle assembly 300 can be concealed into the second needle passing hole 231 and protruded from the second needle passing hole 231, and the second lower cover 230 has second shower holes 232.

In the process of covering the shower assembly 20, in the capsule brewing mode, referring to FIG. 11 and FIG. 12, the capsule coffee 30 acts on the second lower cover 230 to enable the second lower cover 230 to move toward the second upper cover 130, that is, to switch from the first position to the second position. In addition, the needle assembly 300 is switched from the position concealed into the second needle passing hole 231 to the position protruded from the second needle passing hole 231. In this case, water in the water inlet channel 101 is sprayed into the capsule coffee 30 through the needle outlet 322 of the needle assembly 300. In the drip brewing mode, referring to FIG. 11 and FIG. 13, the second lower cover 230 is kept at the first position, and the needle assembly 300 is concealed into the second needle passing hole 231. In this case, water in the water inlet channel 101 flows from the water inlet channel 101 to the needle seat 140, and is then sprayed through the second lower cover 230.

In a more specific embodiment, referring to FIG. 11 and FIG. 12, a third sealing member 240 (or the foregoing first sealing member 220) is sleeved on the periphery of the second needle passing hole 231.

The third sealing member 240 may be designed with reference to the foregoing first sealing member 220. For example, the third sealing member 240 has a second through hole 241 (as shown in FIG. 11) for the needle assembly 300 to pass through. Details are not described again.

In the second type of embodiments, referring to FIG. 10 to FIG. 13, the shower assembly 20 further includes a third elastic telescopic structure 600 disposed between the second upper cover 130 and the second lower cover 230, so that the second lower cover 230 can switch between the first position and the second position relative to the second upper cover 130.

The third elastic telescopic structure 600 may be designed according to the first elastic telescopic structure 400 and the second elastic telescopic structure 500 described above. Details are not described again.

Figure 13:
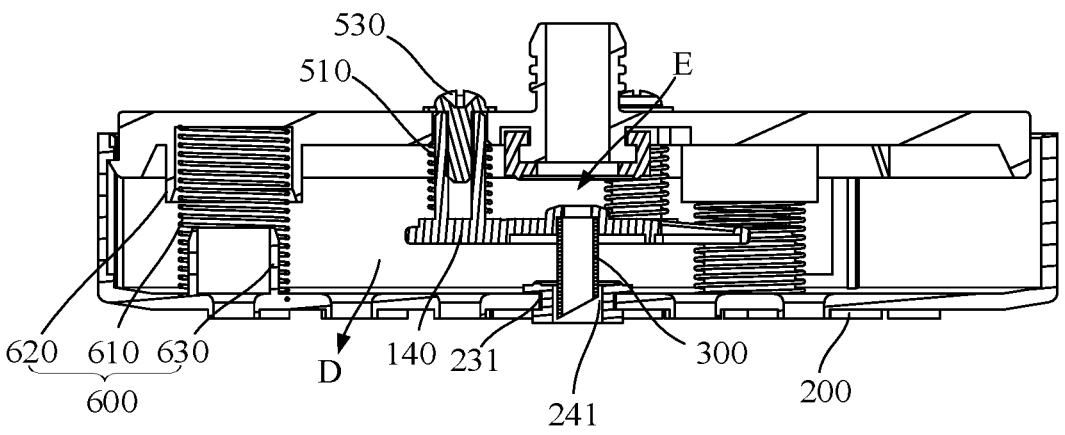
FIG. 13 is a schematic structural diagram of a shower head at a first position according to an embodiment.

In addition, as a preferred solution, referring to FIG. 12 and FIG. 13, the third elastic telescopic structure 600 may include a second guiding seat 620 provided on the second upper cover 130 and a second guiding protrusion 630 provided on the second lower cover 230. The second guiding protrusion 630 can be accommodated into the second guiding seat 620, and a gap for accommodating a third elastic member 610 is required between the second guiding protrusion 630 and the second guiding seat 620.

When the second lower cover 230 is switched from the first position to the second position, the second guiding protrusion 630 is inserted into the second guiding seat 620, and the third elastic member 610 is gradually contracted into the gap between the second guiding protrusion 630 and the second guiding seat 620. In this solution, the second guiding protrusion 630 and the second guiding seat 620 function as the first guiding post 420 and the second guiding post 520 in the foregoing embodiment to guide the second lower cover 230.

Figure 14:
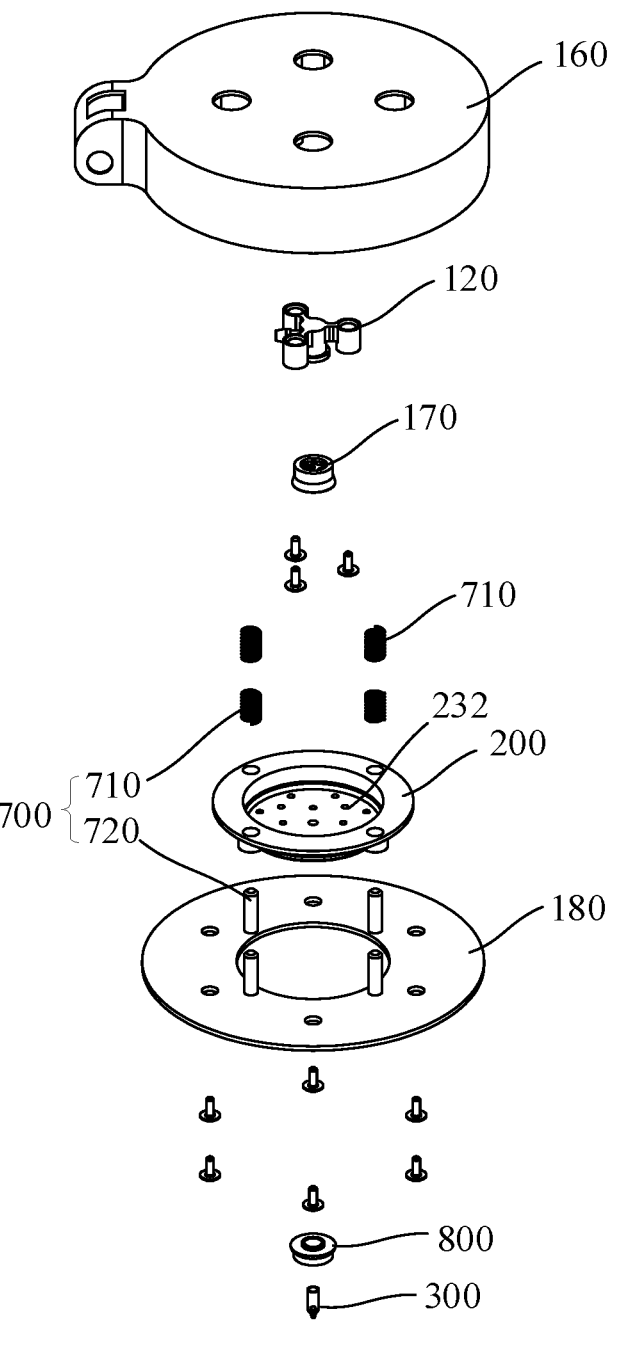
FIG. 14 is a schematic explosion diagram of a shower assembly according to an embodiment.
Figure 15:
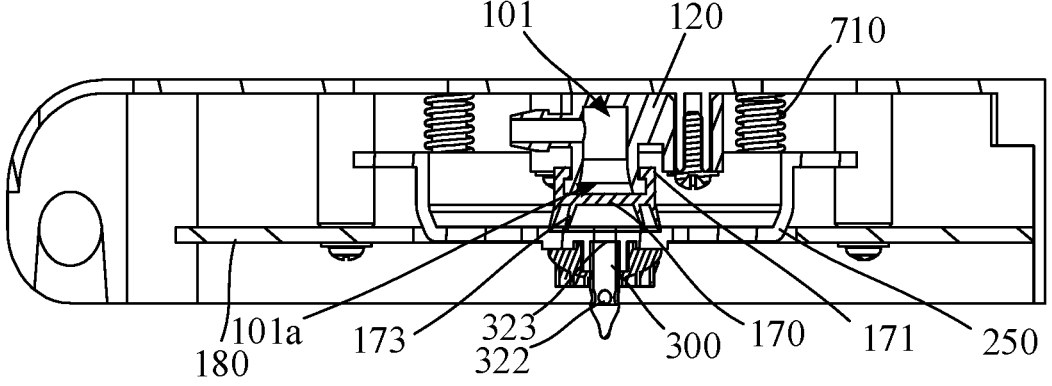
FIG. 15 is a schematic structural diagram of a shower head at a second position according to an embodiment.
Figure 16:
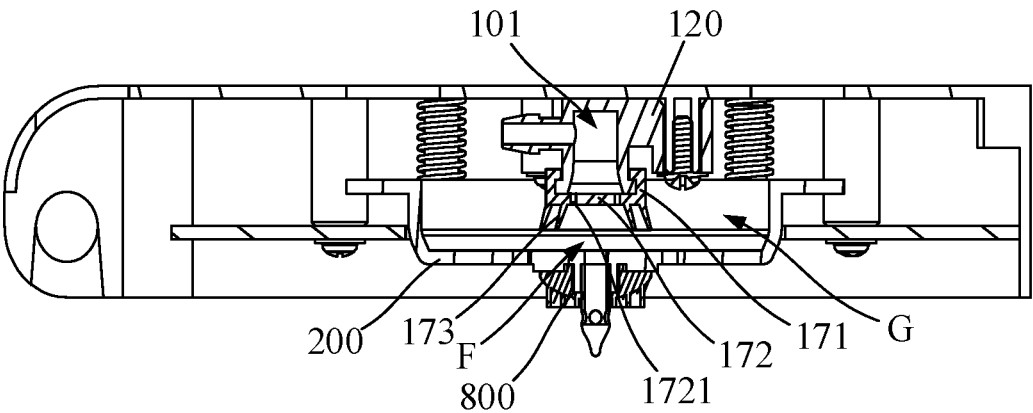
FIG. 16 is a schematic structural diagram of a shower head at a first position according to an embodiment.

In a third type of embodiments, referring to FIG. 14 to FIG. 16, the needle assembly 300 is mounted on the shower head 200 and extends toward a side of the shower head 200 away from the main structure 100, the shower head 200 is provided with a through hole, and the shower head is in communication with the water outlet channel in the needle assembly 300 through the through hole; and when the shower head 200 moves from the first position to the second position, the shower head 200 carries the needle assembly 300 to move to a position where the needle assembly 300 is in sealed communication with the water inlet channel 101.

In the third type of embodiments, compared with the foregoing embodiments, the needle assembly 300 is directly mounted on the shower head 200, which can simplify the mounting of the needle assembly 300.

It is different from the foregoing two types of embodiments that, in the third type of embodiments, the main structure 100 includes an upper cover and a water inlet head 120. For easy distinction, the upper cover is a third upper cover 16. The water inlet head 120 is mounted at a side of the third upper cover 160 facing the shower head 200, the water inlet head 120 forms the water inlet channel 101, the water inlet channel 101 has a water outlet 101*a*, a cavity (referring to numeral F in FIG. 16) is formed between the main structure 100 and the shower head 200, the water outlet 101*a* is in communication with the cavity, and the needle assembly 300 also has a needle inlet 323 for water to enter the water outlet channel; when the shower head 200 is located at the first position, a gap (referring to numeral G in FIG. 16) is provided between the water inlet head 120 and the shower head 200, and the water inlet channel 101 is in communication with the cavity through the gap, so that the water inlet channel 101 is in communication with the shower holes; and when the shower head 200 is located at the second position, the shower head 200 is abutted against the water inlet head 120 to disconnect the communication between the water inlet channel 101 and the cavity, so that the communication between the shower holes and the water inlet channel 101 is disconnected, and the water outlet 101*a* of the water inlet channel 101 and the needle inlet 323 of the needle assembly 300 are in sealed communication.

The shower holes may be provided with reference to the first shower hole 214 and the second shower hole 232 above. Details are not described again.

In a specific embodiment, the main structure 100 further includes a fourth sealing member, and the fourth sealing member 170 is sleeved on the water inlet head 120.

Different from the foregoing manner of directly mounting the needle assembly 300 to the water inlet head 120 (referring to FIG. 7), in this specific embodiment, the needle assembly 300 is mounted on the shower head 200, so that the fourth sealing member 170 enables the needle assembly 300 and the water inlet channel 101 to be in sealed communication when the shower head 200 is located at the second position, and does not interfere with water to flow to the shower head 200 when the shower head 200 is located at the first position.

In a more specific embodiment, referring to FIG. 16, the fourth sealing member 170 includes a clamping portion 171, a water passing portion 172 located at the bottom of the clamping portion 171, and a water guiding portion 173 around the periphery of the water passing portion 172, the clamping portion 171 is configured to circumferentially clamp a water outlet of the water inlet head 120 to circumferentially seal the water outlet, the water passing portion 172 has a plurality of water passing holes 1721, and the water guiding portion 173 is constructed into an outwardly expanded structure, so that water passing through the water passing holes 1721 can uniformly diffuse along the water guiding portion 173.

In the drip brewing mode, referring to FIG. 15, water can flow into the clamping portion 171 from the water inlet channel 101 and then be conveyed to the water guiding portion 173 through the water passing holes 1721. The water guiding portion 173 can diffuse and convey water from inside to outside due to its particular outwardly expanded structure which can cover the shower head 200 as much as possible, so that the shower head 200 can spray water evenly in a large range. In the capsule brewing mode, referring to FIG. 16, the water guiding portion 173 may be abutted against the shower head 200 to cover the shower holes at the middle position of the shower head 200, so that other shower holes are separated from the shower holes at the middle position. In this case, water flows through the water inlet channel 101, the fourth sealing member 170, and the needle assembly 300 successively until sprayed into the capsule coffee 30.

It should be noted that the water guiding portion 173 may be designed in a multi-layer structure. In the example shown in FIG. 15, the water guiding portion 173 has an inner and outer-layer structure, so that the fourth sealing member 170 can be stably supported and sealed on the shower head 200.

In the third type of embodiments, referring to FIG. 14, the main structure 100 further includes a support plate 180, a fourth elastic telescopic structure 700 is disposed between the support plate 180 and the third upper cover 160, the shower head 200 is connected to the fourth elastic telescopic structure 700, so that the shower head 200 can switch between the first position and the second position relative to the third upper cover 160.

The fourth elastic telescopic structure 700 may be designed similarly to the first elastic telescopic structure 400 or the second elastic telescopic structure 500. The fourth elastic telescopic structure 700 may be designed to mainly include a fourth elastic member 710 and a fourth guiding post 720. The action relationship between the fourth elastic member 710 and the fourth guiding post 720 is described in detail.

In addition, in the third type of embodiments, referring to FIG. 14 and FIG. 15, a fifth sealing member 800 may also disposed between the needle assembly 300 and the shower head 200. The fifth sealing member 800 may be in a configuration similar to the first sealing member 220, and is mainly configured to seal the capsule coffee 30 and the needle assembly 300 to prevent water in the capsule coffee 30 from flowing back.

In addition to the above, the embodiments of the present disclosure also provide two types of alternative needle assembly 300:

The first type of needle assembly 300 is as follows: referring to FIG. 12 and FIG. 13, the needle assembly 300 is a hollow tube through in the axial direction, and an end of the hollow tube is formed with a first tip 310.

The second type of needle assembly 300 is as follows: referring to FIG. 4 and FIG. 6, the needle assembly 300 includes a needle tube 320 and a second tip 330 connected to the needle tube 320, the needle tube 320 is through in the axial direction and forms a needle tube flow channel 321 (i.e., the water outlet channel above), and an end of the needle tube 320 close to the second tip 330 is formed with a needle outlet 322 in communication with the needle tube flow channel 321.

For the first type of needle assembly 300, referring to FIG. 12 or FIG. 13, the first tip 310 is used to pierce the capsule coffee 30, and the inside thereof is in sealed communication with the water inlet channel 101, so that water can flow out of the first tip 310.

For the second type of needle assembly 300, the second tip 330 is used to pierce the capsule coffee 30, and the needle tube flow channel 321 is in sealed communication with the water inlet channel 101, so that water can flow out of the needle outlet 322. In addition, a plurality of the needle outlets 322 may be provided and arranged evenly at intervals in the circumferential direction, so that the uniformity of water spraying from the needle outlets 322 can be improved, so as to improve the brewing quality of the capsule coffee 30.

According to another aspect, in the embodiments of the present disclosure, the shower head 200 (the first lower cover 210, the second lower cover 230, etc.) is constructed to have a low-lying portion 250 (as shown in FIG. 7, FIG. 9, FIG. 11, and FIG. 15). The position of the low-lying portion 250 is lower than that of the rest of the shower head 200. The low-lying portion 250 can better receive water flowing out of the needle assembly 300 (the first type of embodiments above) or the water inlet channel 101 (the second type of embodiments and the third type of embodiments above), so that the coffee machine has a more uniform spraying effect when operating in the drip brewing mode.

It is to be noted that parts that can achieve the same function in different embodiments listed in this specification may be applied to other embodiments in a manner that is not detailed in the accompanying drawings in each embodiment. In addition, it can be understood that, based on the embodiments listed in this specification, various structures can be optimized and modified, but these optimizations and modifications are within the protection scope of this application without departing from the concept of this application.

For example, in the foregoing description of the first elastic telescopic structure 400, the feasible third elastic telescopic structure 600 is described incidentally. In another example, in the foregoing description of the first water inlet portion, the second water inlet portion 131 is described incidentally. In addition, in the embodiments listed above, the first upper cover 110 may be interchangeable with the second upper cover 130 and the third upper cover 160, the first lower cover 210 may be interchangeable with the second lower cover 230, the first sealing member 220 may be interchangeable with the third sealing member 240, and the two needle assemblies 300 listed may be interchangeable. More interchange methods will not be described in detail. Based on the content disclosed herein, the interchange methods that do not interfere with the implementation of the technical solutions can be used.

It should be noted that, in the related embodiments listed herein, there are no restrictions on some structural features and the quantity of parts and components used. These structural features and the quantity of parts and components used can be set according to requirements. These structural features include the foregoing mounting protrusion 111, first guiding post 420, second guiding post 520, second guiding seat 620, second guiding protrusion 630, third guiding post, etc. These parts and components mainly include the first elastic member 410, second elastic member 510, third elastic member 610, fourth elastic member 710, etc.

The technical features of the foregoing embodiments can be randomly combined. To make the description concise, all possible combinations of the technical features of the foregoing embodiments have not been described. However, as long as there is no contradiction in the combinations of these technical features, they should be considered as the scope described in this specification.

The foregoing embodiments are merely illustrative of several implementations of this application and the description thereof is more specific and detailed, but cannot therefore be construed as limiting the scope of this application. It should be noted that several modifications and modifications may be made by those of ordinary skill in the art without departing from the concept of this application, all of which fall within the protection scope of this application. Therefore, the protection scope of this application shall be subject to the appended claims.

What is claimed is:

1. A shower assembly, comprising:
   a main structure, formed with a water inlet channel;
   a shower head, provided with shower holes in communication with the outside of the shower head, mounted on said main structure in a manner that can move relative to said main structure, and at least having a first position away from said main structure and a second position close to said main structure; and
   a needle assembly, mounted on said main structure or said shower head, provided with a water outlet channel, and provided with a needle outlet in communication with said water outlet channel, wherein when said shower head is located at said first position, said water inlet channel is in communication with said shower holes, and water in said water inlet channel flows out through said shower holes; and when said shower head is located at said second position, said water inlet channel is not in communication with said shower holes, said water outlet channel is in sealed communication with said water inlet channel, said needle outlet is located below said shower head, and water in said water inlet channel flows out through said needle outlet, wherein said needle assembly is movably mounted on said main structure, and when said shower head moves from said first position to said second position, said shower head can act on said main structure to move said needle assembly to a position in sealed communication with said water inlet channel.

2. The shower assembly according to claim 1, wherein a cavity in communication with said shower holes is formed between said shower head and said main structure, and said needle assembly further has a needle inlet for allowing water to enter said water outlet channel; and said main structure further comprises a needle seat accommodated in said cavity, said needle seat is movably mounted on said main structure, and said needle assembly is mounted on said needle seat;

said needle assembly extends toward a side where said shower head is located, and said needle inlet is located inside said cavity and in communication with said cavity;

when said shower head is located at said first position, a gap is provided between the whole body formed by said needle assembly and said needle seat and a water outlet of said water inlet channel, and said water inlet channel is in communication with said cavity through said gap, so that said water inlet channel is in communication with said shower holes; and when said shower head is located at said second position, the whole body formed by said needle assembly and said needle seat is abutted against said main structure to disconnect the communication between said water inlet channel and said cavity, so that the communication between said shower holes and said water inlet channel is disconnected.

3. The shower assembly according to claim 2, wherein said shower head is formed with a needle passing hole, when said shower head is located at said first position, an end of said needle assembly away from said main structure can be concealed into said needle passing hole, and when said shower head is located at said second position, said end of said needle assembly away from said main structure can extend out from said needle passing hole.

4. The shower assembly according to claim 3, wherein said shower head is further provided with a sealing member, said sealing member is nested at the periphery of said needle passing hole, a plurality of sealing rings are protruded at the bottom of said sealing member, the plurality of sealing rings are arranged at intervals from inside to outside, said sealing member has a first through hole for said needle assembly to pass through, and the hole diameter of said first through hole is smaller than the outer diameter of said needle assembly.

5. The shower assembly according to claim 4, wherein said main structure comprises an upper cover, and an elastic telescopic structure is disposed between said upper cover and said shower head, so that said shower head can switch between said first position and said second position relative to said upper cover.

6. A two-in-one coffee machine, comprising a base, and further comprising said shower assembly according to claim 5, wherein said shower assembly is rotatably mounted on said base.

7. A shower assembly, comprising:

a main structure, formed with a water inlet channel;

a shower head, provided with shower holes in communication with the outside of the shower head, mounted on said main structure in a manner that can move relative to said main structure, and at least having a first position away from said main structure and a second position close to said main structure; and a needle assembly, mounted on said main structure or said shower head, provided with a water outlet channel, and provided with a needle outlet in communication with said water outlet channel, wherein when said shower head is located at said first position, said water inlet channel is in communication with said shower holes, and water in said water inlet channel flows out through said shower holes; and when said shower head is located at said second position, said water inlet channel is not in communication with said shower holes, said water outlet channel is in sealed communication with said water inlet channel, said needle outlet is located below said shower head, and water in said water inlet channel flows out through said needle outlet, wherein said needle assembly is mounted on said shower head and extends toward a side of said shower head away from said main structure, said shower head is provided with a through hole, and said shower head is in communication with said water outlet channel in said needle assembly through said through hole; and when said shower head moves from said first position to said second position, said shower head carries said needle assembly to move to a position where said needle assembly is in sealed communication with said water inlet channel.

8. The shower assembly according to claim 7, wherein said main structure comprises an upper cover and a water inlet head, said water inlet head is mounted at a side of said upper cover facing said shower head, said water inlet head forms said water inlet channel, said water inlet channel has a water outlet, a cavity is formed between said main structure and said shower head, said water outlet is in communication with said cavity, and said needle assembly further has a needle inlet for water to enter said water outlet channel;

when said shower head is located at said first position, a gap is provided between said water inlet head and said shower head, and said water inlet channel is in communication with said cavity through said gap, so that said water inlet channel is in communication with said shower holes; and when said shower head is located at said second position, said shower head is abutted against said water inlet head to disconnect the communication between said water inlet channel and said cavity, so that the communication between said shower holes and said water inlet channel is disconnected, and said water outlet of said water inlet channel and said needle inlet of said needle assembly are in sealed communication.

9. The shower assembly according to claim 8, wherein said main structure comprises a sealing member, said sealing member comprises a clamping portion, a water passing portion located at the bottom of said clamping portion, and a water guiding portion around the periphery of said water passing portion, said clamping portion is configured to circumferentially clamp a water outlet of said water inlet head to circumferentially seal said water outlet, said water passing portion has a plurality of water passing holes, and said water guiding portion is constructed into an outwardly expanded structure, so that water passing through said water passing holes can uniformly diffuse along said water guiding portion.

10. The shower assembly according to claim 9, wherein an elastic telescopic structure is disposed between said upper cover and said shower head, so that said shower head can switch between said first position and said second position relative to said upper cover.

11. A two-in-one coffee machine, comprising a base, and further comprising said shower assembly according to claim 10, wherein said shower assembly is rotatably mounted on said base.

* * * * *